United States Patent
Clarendon et al.

(10) Patent No.: US 10,346,141 B1
(45) Date of Patent: *Jul. 9, 2019

(54) DETERMINISTIC EXECUTION FOR VISUALLY DEVELOPED OPERATIONS

(71) Applicant: Amazon Technologies, Inc., Seattle, WA (US)

(72) Inventors: James Wright Clarendon, Seattle, WA (US); Colin McLaughlan, Seattle, WA (US); Tal Cohen, Huntingdon Valley, PA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,125

(22) Filed: Dec. 4, 2017

Related U.S. Application Data

(63) Continuation of application No. 15/072,289, filed on Mar. 16, 2016, now Pat. No. 9,858,048.

(51) Int. Cl.
  *G06F 9/44* (2018.01)
  *G06F 8/35* (2018.01)
  *G06F 8/34* (2018.01)

(52) U.S. Cl.
  CPC . *G06F 8/35* (2013.01); *G06F 8/34* (2013.01)

(58) Field of Classification Search
  CPC ...................................................... G06F 8/35
  USPC .................. 717/101–106, 120–121
  See application file for complete search history.

(56) References Cited

U.S. PATENT DOCUMENTS

| | | | |
|---|---|---|---|
| 6,002,867 A | 12/1999 | Jazdzewski | |
| 6,081,665 A | 6/2000 | Nilsen et al. | |
| 6,879,926 B2 | 4/2005 | Schmit et al. | |
| 6,947,943 B2 | 9/2005 | DeAnna et al. | |
| 7,065,493 B1 * | 6/2006 | Homsi | G06Q 10/06 705/7.26 |
| 7,284,233 B2 | 10/2007 | Sengodan | |
| 7,386,620 B2 | 6/2008 | Lei et al. | |

(Continued)

OTHER PUBLICATIONS

Stecca et al, "Thread Management in Mashup Execution Platforms", ACM, pp. 837-840, 2010 (Year: 2010).*

(Continued)

*Primary Examiner* — Anil Khatri
(74) *Attorney, Agent, or Firm* — BakerHostetler

(57) ABSTRACT

A visual development interface may be exposed that allows developers to define, generate, and submit various computing operations for execution by a computing services provider. In some examples, the visual development interface may be employed by developers to define, generate, and submit event-triggered computing functions for execution on the computing services provider's systems. The visual development interface may allow developers to define computing operations based, at least in part, on various nodes that may represent various sub-operations or other functionality associated with a computing operation. The computing service provider may execute the computing operation using a deterministic execution engine that executes the computing operation in an organized, predictable, and reliable manner. In particular, the deterministic execution engine may employ a stage-by-stage node activation process, in which one or more associated nodes are activated in a respective stage.

20 Claims, 8 Drawing Sheets

(56) References Cited

U.S. PATENT DOCUMENTS

| | | | |
|---|---|---|---|
| 7,437,706 B2* | 10/2008 | Woodgeard | G06F 8/20 717/103 |
| 7,673,180 B1* | 3/2010 | Chen | G06F 11/362 714/38.11 |
| 7,730,450 B2 | 6/2010 | Mercer | |
| 7,970,729 B2* | 6/2011 | Cozzi | G06F 17/30604 707/601 |
| 8,170,901 B2* | 5/2012 | Shukla | G06Q 10/06 705/7.12 |
| 8,392,826 B2 | 3/2013 | Randall et al. | |
| 8,464,214 B2 | 6/2013 | Miloushev et al. | |
| 8,473,898 B2 | 6/2013 | Pandey | |
| 8,527,939 B2 | 9/2013 | Elad et al. | |
| 8,621,419 B2* | 12/2013 | Woodgeard | G06F 8/20 717/102 |
| 8,689,171 B2* | 4/2014 | Lucas | G06F 9/4494 717/104 |
| 8,756,565 B2 | 6/2014 | Graf et al. | |
| 8,832,643 B2 | 9/2014 | Schmeling et al. | |
| 8,898,624 B2* | 11/2014 | Bouillet | G06F 16/972 717/106 |
| 9,021,431 B2 | 4/2015 | Laval et al. | |
| 9,032,377 B2* | 5/2015 | Mizrachi | G06F 8/41 717/140 |
| 9,043,746 B2* | 5/2015 | Rabinovich | G06F 8/10 717/105 |
| 9,172,608 B2 | 10/2015 | Zeyliger et al. | |
| 9,323,556 B2 | 4/2016 | Wagner | |
| 9,430,644 B2* | 8/2016 | Aguayo Gonzalez | G06F 21/55 |
| 9,501,375 B2 | 11/2016 | Frenz | |
| 9,524,296 B2 | 12/2016 | Richards | |
| 9,858,048 B1* | 1/2018 | Clarendon | G06F 8/35 |
| 10,203,762 B2* | 2/2019 | Bradski | H04N 13/167 |
| 2017/0083292 A1 | 3/2017 | McLaughlan et al. | |
| 2017/0286526 A1* | 10/2017 | Bar-Or | G06F 8/34 |
| 2017/0351511 A1* | 12/2017 | Bar-Or | G06F 8/34 |

OTHER PUBLICATIONS

Weiss et al, "Introducing the QCEP-Testing System for Executable Acceptance Test Driven Development of Complex Event Processing Applications", ACM, pp. 13-18, 2013 (Year: 2013).*

Cabezas et al, "Automatic Parallelization of Kernels in Shared-Memory Multi-GPU Nodes", ACM, pp. 3-13, 2015 (Year: 2015).*

Kaleba et al, "Assessing primitives performance on multi-stage execution", ACM, pp. 1-10, 2018 (Year: 2018).*

Bondi, "A Microcoded Real-Time Executive for Numeric Support Nodes Distributed within Embedded Networks", IEEE, pp. 54-56, 1988 (Year: 1988).*

Raman et al, "Parallel-Stage Decoupled Software Pipelining", ACM, pp. 114-123, 2008 (Year: 2008).*

Engel et al, "Towards Proactive Event-Driven Computing", ACM, pp. 125-136, 2011.

Madiseiti et al, "Synchronization Mechanisms for Distributed Event-Driven Computation", ACM Transactions on Modeling and Computer S.about.mulatlon, Vnl. 2, No. 1, pp. 12-51, 1992.

Li et al, "Stabilizing Bit-Rates in Quantized Event Triggered Control Systems" ACM, pp. 245-254, 2012.

Even et al, "Better Deterministic Online Packet Routing on Grids", ACM, pp. 284-293, 2015.

Pop et al, "Design Optimization of Mixed Time/Event-Triggered Distributed Embedded Systems", ACM, pp. 83-89, 2003.

Zhong et al, "Sensor Node Localization with Uncontrolled Events", ACM Transactions on Embedded Computing Systems, vol. 11, No. 3, Article 65, pp. 1-25, 2012.

* cited by examiner

US 10,346,141 B1

DETERMINISTIC EXECUTION FOR VISUALLY DEVELOPED OPERATIONS

CROSS-REFERENCE TO RELATED APPLICATIONS

This Application is a continuation of U.S. patent application Ser. No. 15/072,289 filed on Mar. 16, 2016, the disclosure of which is hereby incorporated by reference as if set forth in its entirety herein.

BACKGROUND

Some computing services providers may be used by content developers to execute, on behalf of the developers, various content items that are made available to large numbers of different users. For example, some computing services providers may operate large collections of data centers, servers, and other computing resources that may be used to host execution of content, such as cloud-based video games, that may be accessed by large numbers of players and other users. In this example, the game developer may benefit from using the computing resources made available by the computing services provider by allowing the developer's game to execute efficiently and be made available to large numbers of users. While use of computing services may provide many advantages to developers, it may also involve a number of drawbacks. For example, in order to tailor the developer's content so that it can be executed properly by the computing services provider, the developer may sometimes be forced to become an expert in particular programming languages, instructions, systems, and components that are employed by the computing services provider. The developers may often have limited, if any, pre-existing knowledge in these areas and may lack the time, interest, and resources to become proficient. For these and other reasons, developers may benefit greatly from a tool that allows the developers to define and generate computing operations that may be executed by the computing providers in a format that is familiar and intuitive to the developers. Moreover, it is also advantageous for the service provider to be able to execute such computing operations in an efficient and reliable manner in which operations may be executed in an organized and predictable fashion. This may sometimes be particularly advantageous in the case of certain computing operations, such as event-triggered computing functions.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
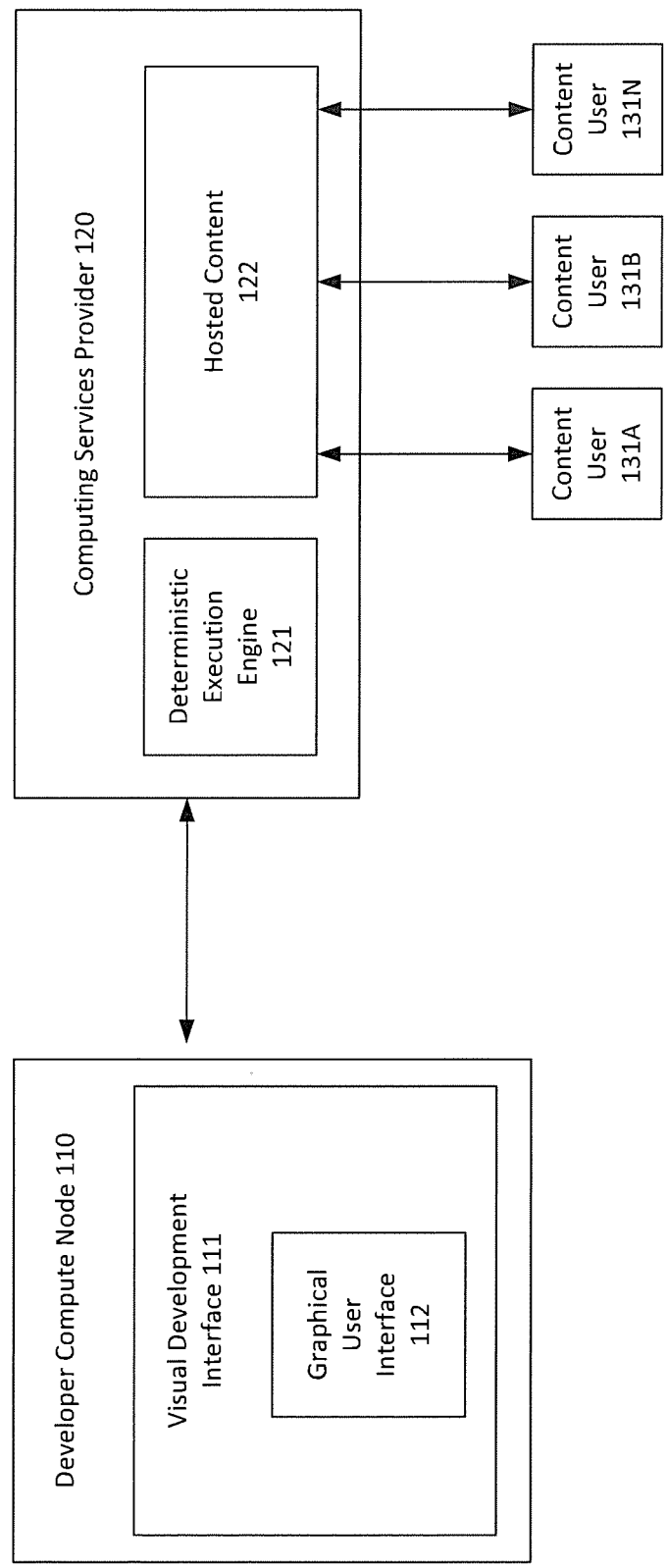
FIG. 1 is a diagram illustrating an example system for visual computing operation development and deterministic execution that may be used in accordance with the present disclosure.

Techniques for deterministic execution for visually developed computing operations are described herein. A visual development interface may be exposed that allows developers to define, generate, and submit various computing operations for execution by a computing services provider, such as a computing services provider that hosts execution of one or more content items developed by the developer. In one specific example, the developer may be a video game developer, and the computing services provider may host cloud-based execution of the developer's video games for access by large numbers of players. In some examples, the visual development interface may be employed by developers to define, generate, and submit event-triggered computing functions for execution on the computing services provider's systems. It is noted, however, that the disclosed techniques are not limited to event-triggered computing functions and may be employed with respect to other computing operations, such as a graphics shading-related operations, animation tree operations, data definition operations, and many other operations.

In some examples, the visual development interface may allow developers to define computing operations based, at least in part, on various nodes that may represent various sub-operations or other functionality associated with a computing operation. In some examples, a computing operation may be defined using a visual representation, which is a collection of nodes that defines a respective computing operation. The visual representation may display graphical indications of the nodes, which may be selected, organized and manipulated by the developers. The visual representation may also display graphical indications of inputs and outputs of various nodes, such as by using lines and arrows to connect different nodes and indicate directionality of information flow between nodes. The graphical depictions of nodes, inputs, outputs, and other associated information may allow developers to define and generate computing operations in a familiar and intuitive manner that is easy to control and manipulate.

In some examples, the nodes in the development interface may be organized into various classes that designate the functionality of node. Each class of nodes in the visual development interface may have an associated first data set that defines or otherwise relates to its respective functionality. In some cases, these first data sets may be formatted in a first programming language that is well-suited for execution in association with the visual development interface, such as C++ and other general-purpose programming languages. Also, in some examples, each node class may have a respective second data set that defines or otherwise relates to the node's respective functionality and is formatted in a language that is well-suited for execution in association with the underlying service provider systems, such as NODE.JS, JAVASCRIPT, JAVA, or PYTHON. The visual development interface may be capable of converting, translating or otherwise associating each first data with a respective second set. Thus, the visual development interface may further benefit developers by not requiring the developers to learn and become proficient in computing languages employed by the underlying service provider systems.

In some cases, upon completion of defining of a visual representation for a computing operation by a developer within the visual development interface, the visual development interface may generate instructions for executing the computing operation on the computing service provider's systems. These instructions may be generated based on a process that includes verifying the visual representation of the computing operation to ensure that it meets a set of requirements, such as requirements for confirming that the computing operation will execute in a valid manner. Additionally, the instructions may be generated by obtaining and inserting into the instructions the second data set (e.g., Node.js code) for each class of nodes included in the representation. Furthermore, the instructions may be generated by inserting into the instructions information for each node instance within the representation, such as information for building the node instance and processing the node instance to provide output to other nodes. The instructions may then be submitted for execution on the computing service provider's systems. It is also noted that, in some examples, event-triggered computing functions and/or other computing operations may be initiated by game clients and other client applications or components. In some cases, the visual development interface and/or other interfaces or services may be employed to generate client side code, or any other code, that initiates or is otherwise associated with event-triggered computing functions and/or other computing operations.

The computing service provider may then execute the computing operation using a deterministic execution engine that executes the computing operation in an organized, predictable, and reliable manner. In particular, the deterministic execution engine may employ a stage-by-stage node activation process, in which one or more associated nodes are activated in each respective stage. Within at least one (e.g., each) stage, at least one (e.g., each) active node that provides output to one or more other nodes may activate one or input ports on the one or more other nodes, and send one or more outputs to the one or more other nodes based, at least in part, on functionality associated with the active node. The active node may also confirm that the one or more other nodes are added to a list of one or more nodes for activation in a subsequent execution stage. The active node may then deactivate its ports. Processing may then advance to a subsequent execution stage, and the nodes that were added to the list of nodes for activation in the subsequent execution stage may then be activated for repetition of the above described procedures. By executing the computing operation in a deterministic manner such as described above, the execution engine may provide greater efficiency and reliability to both developers and users of the computing services, for example by helping to ensure that predictable and accurate results are returned. Moreover, execution of the computing operation in a deterministic manner may provide greater support for asynchronous operations, including event-triggered computing functions and other operations.

FIG. 1 is a diagram illustrating an example system for visual computing operation development and deterministic execution that may be used in accordance with the present disclosure. As shown in FIG. 1, a developer compute node 110 and content users 131A-N communicate with a computing services provider 120. Developer compute node 110 and content users 131A-N may communicate with computing services provider 120 using one or more electronic communications networks, for example using one or more local area networks (LANs) and/or one or more wide area networks (WANs) such as the Internet. In some examples, developer compute node 110 may be operated by a content developer, such as a cloud-based video game developer. As also shown in FIG. 1, computing services provider 120 hosts execution of hosted content 122. In some examples, hosted content 122 may be content that is developed by the developer that operates developer compute nodes 110. For example, hosted content 122 may include cloud-based video game content developed by the operator of developer compute node 110. Content users 131A-N may be users that access and participate in the execution of hosted content 122. For example, if hosted content 122 includes cloud-based video game content, content users 131A-N may include players that access and participate in the execution of the cloud-based video games.

In some examples, to execute and allow access to hosted content 122, computing services provider 120 may operate large numbers of connected servers, for example executing in various data centers and/or other locations that may be remote and/or local with respect to one another. Some example computing service provider systems, including services that employ virtual machines and other related components, are described in detail below, for example with respect to FIG. 7. It is noted that, although only a single developer compute node 110 is shown in FIG. 1, computing services provider 120 may host any number of different types of content for any number of different developers. For example, in some cases, computing services provider 120 may host multiple different video games developed by multiple different developers, as well as multiple different types of other content (e.g., business and productivity content, other media and entertainment content, etc.) developed by multiple different developers.

As shown in FIG. 1, developer compute node 110 includes a visual development interface 111 that allows the developer to visually define and generate various computing operations and to submit the computing operations for execution by computing services provider 120. The computing operations that may be generated using visual development interface 111 may include, for example, computing operations related to the execution of the developer's hosted content 122 that is executed by the computing services provider 120. In some examples, these computing operations may include event-triggered computing functions, graphics shading-related operations, animation tree operations, data definition operations, and many other operations. Also, in some examples, the computing operations may be asynchronous operations. As also shown in FIG. 1, visual development interface 111 includes a graphical user interface (GUI) 112 that visually displays various graphical elements that may be used to define and build computing operations for submission to computing services provider 120. As will be described in greater detail below, the visual development interface 111 may allow developers to define computing operations based, at least in part, on various nodes that may represent various sub-operations or other functionality associated with a computing operation. The visual development interface 111, via GUI 112, may display graphical indications of the nodes, as well as graphical indications of inputs and outputs of various nodes.

Computing operations that are defined and generated using visual development interface 111 may be submitted to computing services provider 120 for execution on the provider computing systems. In particular, as shown in FIG. 1, computing services provider 120 includes a deterministic execution engine 121 for executing computing operations generated and submitted by visual development interface 111. As will be described in greater detail below, deterministic execution engine 121 executes the computing operations by employing an organized stage-by-stage node activation process, which provides predictable and reliable results, thereby enhancing the experiences of both content developers and content users 131A-N.

Figure 2:
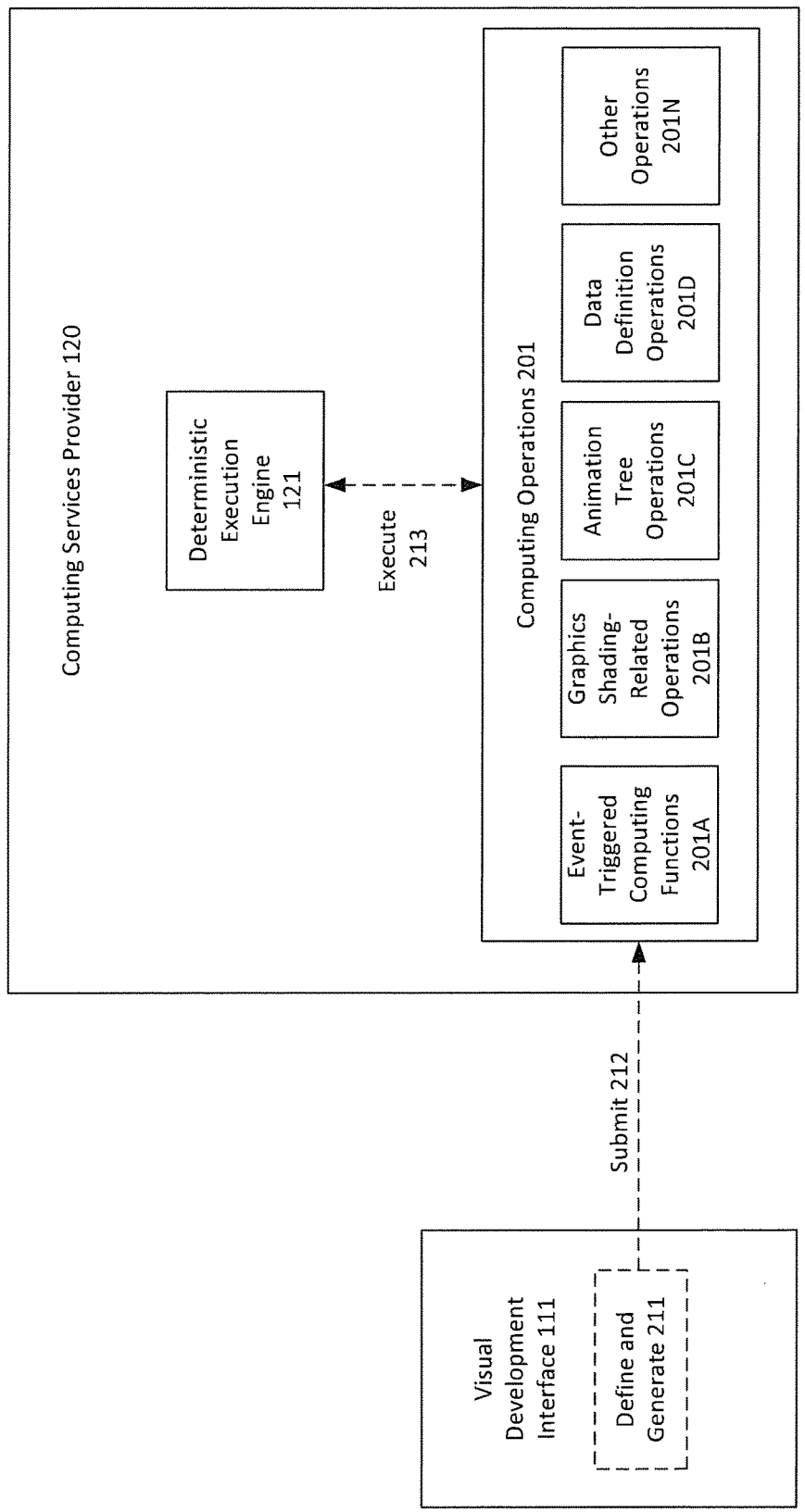
FIG. 2 is a diagram illustrating definition, generation, submission, and execution of example computing operations that may be used in accordance with the present disclosure.

FIG. 2 is a diagram illustrating definition, generation, submission, and execution of example computing operations that may be used in accordance with the present disclosure. As shown in FIG. 2, visual development interface 111 (e.g., executing on developer compute node 110) defines and generates one or more computing operations 201. The definition and generation of computing operations 201 is indicated in FIG. 2 by dashed box 211. The definition and generation of computing operations 201 is described in detail below, for example with reference to FIGS. 3-5. Some example computing operations 201 depicted in FIG. 2 include event-triggered computing functions 201A, graphics shading-related operations 201B, animation tree operations 201C, data definition operations 201D, and other operations 201N. It is noted that, in some examples, event-triggered computing function 201A (as well as other types of computing operations/functions) may be cloud-based functions, for example when computing services provider 120 executes one or more cloud-based computing systems. It is also noted that any or all of computing operations 201 may be asynchronous operations. Upon being defined and generated by visual development interface 111, computing operations 201 are submitted to computing services provider 120, as indicated by dashed arrow 212. The computing operations 201 may then be executed by deterministic execution engine 121 (as indicated by dashed arrow 213), for example upon occurrence of an associated triggering event or other conditions or criteria. The execution of computing operations 201 is described in detail below, for example with reference to FIG. 6.

Figure 3:
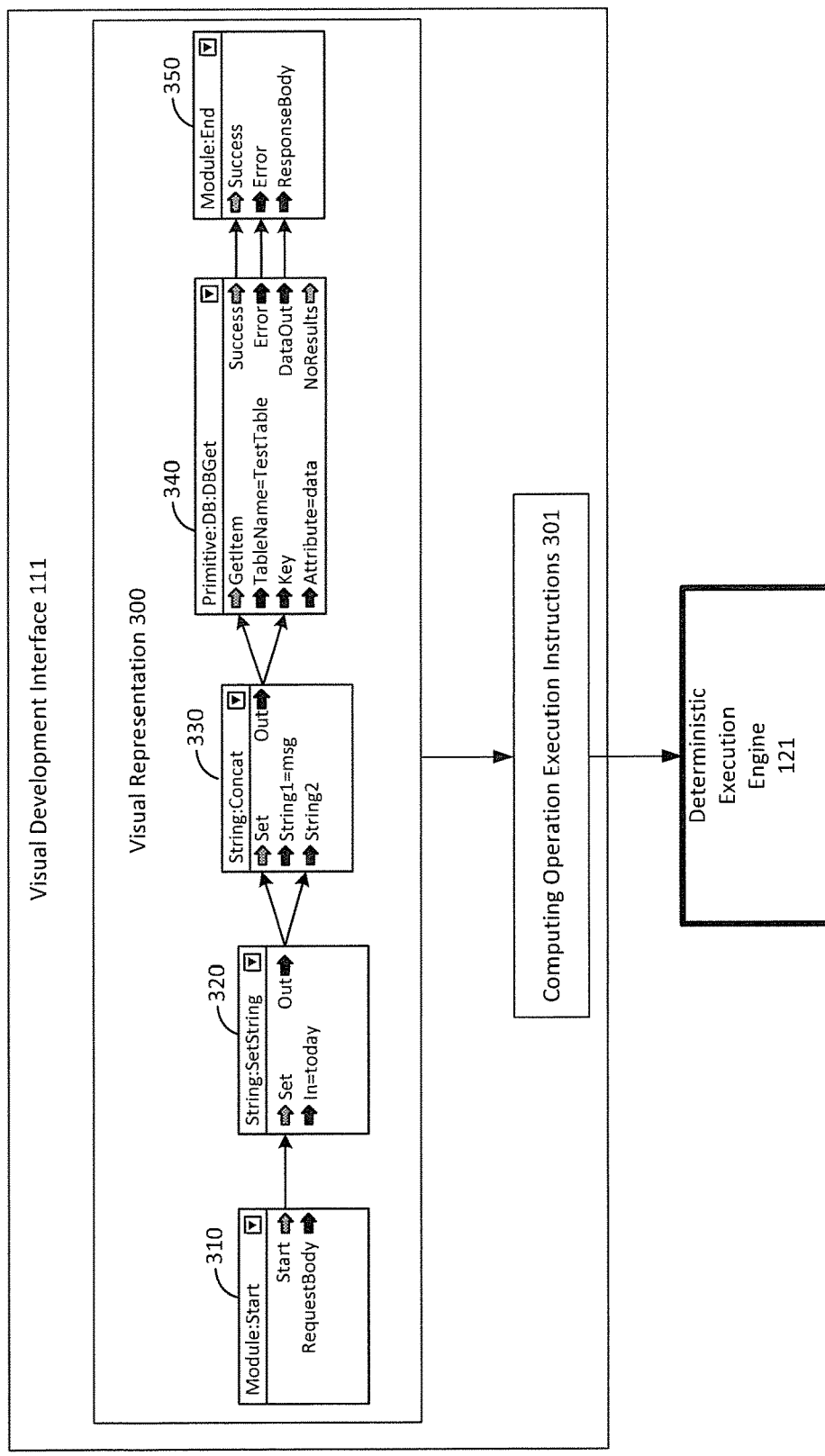
FIG. 3 is a diagram illustrating an example visual representation of a computing operation that may be used in accordance with the present disclosure.

FIG. 3 is a diagram illustrating an example visual representation of a computing operation that may be used in accordance with the present disclosure. As shown in FIG. 3, visual development interface 111 may be used to create, edit, and display (e.g., via GUI 112 of FIG. 1) a visual representation, such as example visual representation 300 shown in FIG. 3. In the particular example of FIG. 3, visual representation 300 represents an event-triggered computing function that executes to retrieve a message of the day. The visual representation 300 includes five nodes 310, 320, 330, 340 and 350, which represent various sub-operations or other functionality associated with the event-triggered computing function. Nodes 320-350 each include one or more input ports, which are indicated by arrows on the left side of each node facing inwards towards the center of the node. Nodes 310-340 each include one or more input ports, which are indicated by arrows on the right side of each node facing outwards to the right edge of the node. The visual representation 300 also displays graphical indications of inputs and outputs of various nodes, such as by using lines and arrows to show connections between different nodes and indicate directionality of information flow between nodes.

Visual representation 300 indicates that the represented function is initiated at a start node (i.e., Module:Start node 310), which, when activated, will, in turn, activate the "Set" input port of String:SetString node 320 via the connection from the "Start" output port of node 310 to the "Set" input port of node 320. The String:SetString node 320 will set a respective string value to "today" and then send the string to String:Concat node 330 via the connection from the "Out" output port of node 320 to the "String2" input port of node 330. Node 320 will also activate the "Set" and "String2" input ports of node 330 via the connections from the "Out" output port of node 320 to the "Set" and "String2" input ports of node 330. Node 330 will set a string value to "msg" and then concatenate the string "msg" with the string "today." Node 330 will then send the concatenated string to nodePrimitive:DB:DBGet node 340 via the connection from the "Out" output port of node 330 to the "Key" input port of node 340. Node 330 will also activate the "GetItem" and "Key" input ports of node 340 via the connections from the "Out" output port of node 330 to the "GetItem" and "Key" input ports of node 340. Node 340 will get an item from a table named "TestTable" using a key formed by the concatenated "msgtoday" string with a data attribute. If there is an error with the data retrieval, then the "Error" output port of node 340 will activate the "Error" input port of the function's end node (i.e., Module:end node 350) via the connection from the "Error" output port of node 340 to the "Error" input port of node 350. If, on the other hand, the data retrieval is successful, then the "Success" output port of node 340 will activate the "Success" input port of node 350 via the connection from the "Success" output port of node 340 to the "Success" input port of node 350. Additionally, node 340 will send the retrieved data to node 350 via the connection from the "Dataout" output port of node 340 to the "ResponseBody" input port of node 350.

In some examples, the nodes 310-350 that are included in visual representation 300 may be selected from a collection of available node classes provided by visual development interface 111. Also, in some examples, the available node classes may be exposed or otherwise made available by computing services provider 120. Also, in some examples, developers and/or other parties may create or provide their own node classes or modify node classes exposed by the computing services provider 120. Each node class may be used to define functionality that is performed by nodes of that respective class. For example, node 310 may be an instance of a Start node class that is used to start event-triggered computing functions. As another example, node 320 may be an instance of a String:SetString node class that is used to set string values. As another example, node 330 may be an instance of a String:Concat node class that is used to concatenate string values. As yet another example, node 350 may be an instance of an End node class that is used to end event-triggered computing functions. In some examples, visual development interface 111 may allow developers to select node class instances and to select input and output values for the node instances, for example by connecting different nodes, input ports, and output ports as shown in visual representation 300 and by assigning values to node inputs and outputs (e.g., by assigning the value "today" to the string set by node 320).

In some examples, different types of computing operations may be assigned their own respective node classes. Also, in some examples, the respective node classes may only be permitted for use in visual representations defining their associated computing operations. For example, in some cases, an event-triggered processing function may have its own respective node classes, which, in some examples, may only be used to define event-triggered processing functions and not for other types of computing operations. For example, in some cases, a developer may request to create a new visual representation and may identify an event-triggered processing function as a type of operation for which the visual representation is being created. Once the developer opens and begins working inside the new visual representation, only event-triggered processing nodes may be made available to the developer for use in the new visual representation. This may help to ensure that the developer selects and uses the appropriate nodes for the computing operation that is being generated.

Also, in some examples, each type of computing operation may be assigned its own respective rules and requirements that may be wholly or partially the same or different from other types of computing operations. For example, in some cases, an event-triggered processing function may be required to have its own operation-specific start node and end node. Also, in some examples, the end node may be required to have inputs including success and error inputs. Furthermore, in some examples, it may be required that the end node must be reachable from the start node, and that the graph must also be able to reach the end node from any state in the graph, for example to avoid dead ends and infinite loops.

Figure 4:
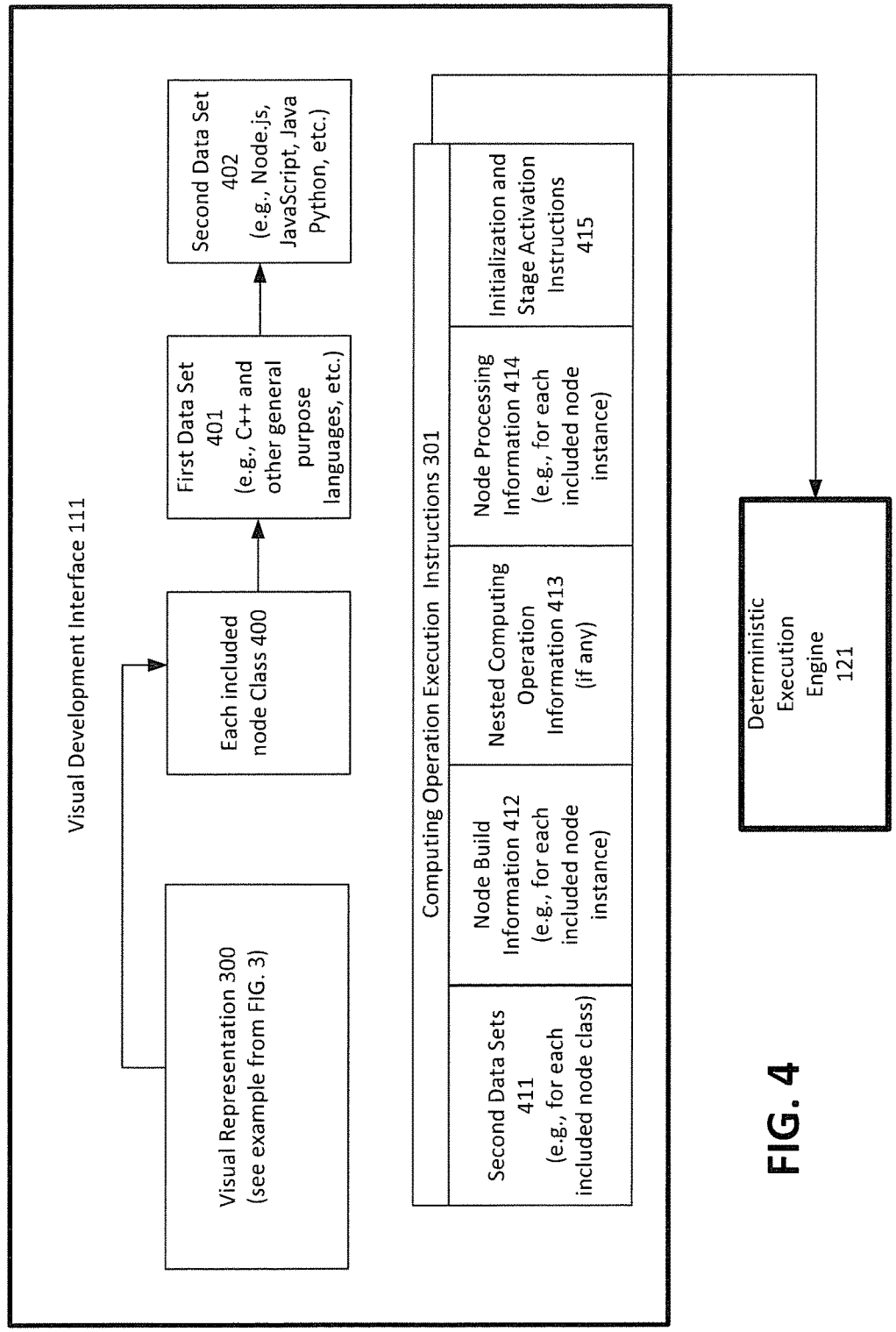
FIG. 4 is a diagram illustrating example computing operation execution instructions that may be used in accordance with the present disclosure.

Thus, as described above, visual representation 300 may define its represented computing operation using the nodes 310-350 and other graphical indications (e.g., inputs and outputs) included in the visual representation 300. As also shown in FIG. 3, upon completion of creation of visual representation 300, visual development interface may generate computing operation execution instructions 301 based, at least in part, on visual representation 300 and may submit the computing operation execution instructions 301 for execution by deterministic execution engine 121. Some example techniques for generation of computing operation execution instructions 301 will now be described in detail. As set forth above, a visual representation 300 may include nodes belonging to various different node classes that define their respective functionality. Referring now to FIG. 4, it is seen that visual development interface may identify each node class 400 that is included in visual representation 300. Each included node class 400 may have an associated first data set 401 that defines or otherwise relates to its respective functionality. In some cases, these first data sets 401 sets may be formatted in a first programming language that is well-suited for execution in association with the visual development interface 111, such as C++ and other general-purpose programming languages. Also, in some examples, each included node class 400 may have a respective second data set 402 set that defines or otherwise relates to the node's respective functionality and is formatted in a language that is well-suited for execution in association with the computing service provider 120, such as Node.js, JavaScript, Java, or Python. In some examples, for each included node class 400, the visual development interface may be capable of associating each first data set 401 to a respective second set 402. In some examples, visual development interface 111 may translate or convert a first data set 401 to a respective second data set 402 (or vice-versa). Also, in some examples, a first data set 401 may be pre-translated or pre-converted to a respective second data set 402 (or vice-versa), and visual development interface 111 may store a record of an association between the first and second data sets 401 and 402 that allows them to be quickly and easily associated and matched to one another.

As also shown in FIG. 4, visual development interface 111 may generate computing operation execution instructions 301 based, at least in part, on visual representation 300. In particular, computing operation execution instructions 301 include second data sets 411, for example for each node class that is included in visual representation 300. Thus, visual development interface 111 may identify each node class 400 included within visual representation 300, obtain its associated second data set 411, and insert its associated second data set 411 into computing operation execution instructions 301.

It is also noted that, in some examples, computing service provider 120 may host systems that may efficiently execute C++ and other general-purpose programming languages. In these and other cases, it may sometimes be unnecessary to convert or translate a first data set 401 into a second data set 402, and the first data set 401 may be executed directly by the computing service provider 120. In these cases, the first data sets for each node class may sometimes be included in the computing operation execution instructions 301 rather than the second data sets.

Additionally, computing operation execution instructions 301 include node build information 412, for example for each node instance included within visual representation 300. The build information 412 for a node instance may include, for example, an indication of its associated node class, and an identifier that uniquely identifies each node instance within its node class. For example, if a visual representation were to include two nodes within a Math:Add class, they may sometimes be identified as Math:AddNode1 and Math:AddNode2. The build information 412 for a node instance may also include, for example, indications of the node instance's inputs and outputs. For example, in some cases, the build information 412 may include indications of output port(s) on the node instance, the node(s) to which they provide output, and the input port(s) to which they provide output.

Computing operation execution instructions 301 may also sometimes include nested computing operation information 413 for one or more associated node instances within the visual representation 300. For example, visual development interface 111 may allow developers to generate various nested computing operations that may be defined, for example using their own visual representations, and then inserted into and reused in other computing operations. This may save the developer from having to re-create a representation for the nested computing operation each time that the nested computing operation is reused. If a computing operation includes other nested computing operations, then information regarding these nested computing operations (e.g., data/information 411-415) may be included for each node instance associated with the nested operations.

Computing operation execution instructions 301 also include node processing information 414, for example for each node instance included within visual representation 300. The node processing information 414 for a node instance may include, for example, information for sending output from the node to each other node that is designated to receive the output, for example based on the connections shown in visual representation 300. In greater detail, for a given node output, the node processing information 414 may include instructions to identify an output port on the node that provides the output, to activate each input port on each other node that receives the output, and to send the output to each input port on each other node that receives the output.

Additionally, the node processing information 414 may include instructions to add each other node that receives the output from the node instance to a list of one or more nodes for activation in a subsequent execution stage (unless the node has already been added to that list). As will be described in greater detail below, the computing operation execution instructions 301 may be executed using multiple activation stages, and node processing information 414 may be used to allow nodes to be activated in an organized manner based on output that they receive from other nodes.

As also shown in FIG. 4, computing operation execution instructions 301 may also include initialization and stage activation instructions 415, such as instructions for initializing node values at the start of execution, instructions for initiating computing operation execution at a first stage at which the start node is activated, instructions for advancing from a current stage to a subsequent stage upon processing of all active nodes for the current stage, and instructions for activating nodes for a subsequent stage upon advancement to the subsequent stage. These instructions are described in greater detail below with reference to FIG. 6.

As set forth above, in some examples, event-triggered computing functions and/or other computing operations may be initiated by game clients and other client applications or components. In some cases, the visual development interface 111 and/or other interfaces or services may be employed to generate client side code, or any other code, that initiates or is otherwise associated with event-triggered computing functions and/or other computing operations. Thus, in some examples, client side code corresponding to the computing operation execution instructions 301 may also be generated by the visual development interface 111 and/or other components and provided to the computing service provider 120 and/or any of its connected clients.

Some example code relating to generation of computing operation execution instructions will now be described. In particular, one example of code associated with node-related classes that may be included in the computing operation execution instructions is shown in the example code below:

```
var FGNode=function (inputs, outputs, outgoingEdges, processEvent) {
    this.inputs=inputs;
    this.inputsMap={ };
    var input;
    for (var i=0; i<inputs.length; i++) {
    input=inputs [i];
    this.inputsMap [input.name]=i;
    }
    this.outputs=outputs;
    this.outputsMap={ };
    var output;
    for (var i=0; i<outputs.length; i++) {
    output=outputs [i];
    this.outputsMap [output.name]=i;
    }
    this.outgoingEdges=outgoingEdges;
    this.processEvent=processEvent;
};
var Input=function (name, value) {
    this.name=name;
    this.value=value;
    this.isActive=false;
};
var Output=function (name) {
    this.name=name;
};
var OutgoingEdge=function (fromPort, toNode, toPort) {
    this.fromPort=fromPort;
    this.toNode=toNode;
    this.toPort=toPort;
};
var DebugTransition=function (outgoingEdge, value) {
    this.outgoingEdge=outgoingEdge;
    this.value=value;
};
```

As shown in the above example code, FGNode is an example main node class, which takes an array of inputs, an array of outputs, an array of outgoing edges, and a processEvent( ) function. The example FGNode class also maintains an input mapping and an output mapping so that inputs and outputs can be accessed by their names. The processEvent( ) function is a pointer to each node's implementation function where the specific implementation lies. As also shown in the above code, the Input class takes the name of an input port, its value, and an indication of whether the input is currently active, which is by default false. Additionally, in this example, there is an Output class, which takes a name of an output. The OutgoingEdge class takes three integer values, which include the fromPort, the toNode, and the toPort. The toNode is the identifier corresponding to which node this edge points to. The fromPort and toPort parameters are indices. These indices correspond to the output port (fromPort) in the current node's output array and the input port (toPort) in the toNode's input array. It may also have a comment and the end of the line for debugging purposes stating the names associated with the identifiers. The DebugTransition class takes an OutgoingEdge and a value. This may be used for sending back debug information to be shown in the visual development interface 111.

Additionally, some example code associated with build information for an example node instance that may be included in the computing operation execution instructions is shown below:

```
function StringConcatNode2( ){
    var inputs={ };
    inputs.push (new Input ("Activate", null));
    inputs.push (new Input ("String1", "msg!"));
    inputs.push (new Input ("String2", null));
    var outputs=[ ];
    outputs.push (new Output ("Out"));
    var outgoingEdges=[ ];
    outgoingEdges.push (new OutgoingEdge (0, 3, 0)); / / Out, DBGetNode3, GetItem
    outgoingEdges.push (new OutgoingEdge (0, 3, 3)); / / Out, DBGetNode3, KeyValue
    var processEvent=function (node) {
    StringConcat (node);
    };
    return new FGNode (inputs, outputs, outgoingEdges, processEvent);
}
```

In particular, the above code represents example build information for String:Concat node 330 of FIG. 3. Specifically, the above code indicates the inputs for node 330, including the Set port (represented by the word "Activate") and the String1 and String2 ports. The above code also indicates the outputs of node 330, including the Out port. In the outgoingEdges section, the above code also indicates that the Out port of node 330 provides input to the GetItem and Key ports of DBGet node 340 of FIG. 3. An indication of the processEvent for String:Concat node 330 is also shown.

Furthermore, some example code associated with node processing information for an example node instance that may be included in the computing operation execution instructions is shown below:

```
function stringConcat (node) {
    if (isPortActive(node, "Activate")) {
        var str1=getInputPortValue (node, "String1");
        var str2=getInputPortValue (node, "String2");
        var out=str1+str2;
        sendOutput (node, "Out", out);
    }
}
```

In particular, the above code represents example node processing information for String:Concat node 330 of FIG. 3. Specifically, the above example code shows that, if the String:Concat node 330 is activated via its activation port, then the str1 and str2 variables may take their values from the String1 and String2 input ports, respectively. The out variable is then set to the concatenation of the str1+str2 variables. The out variable is then sent as output via the Out port of node 330.

Figure 5:
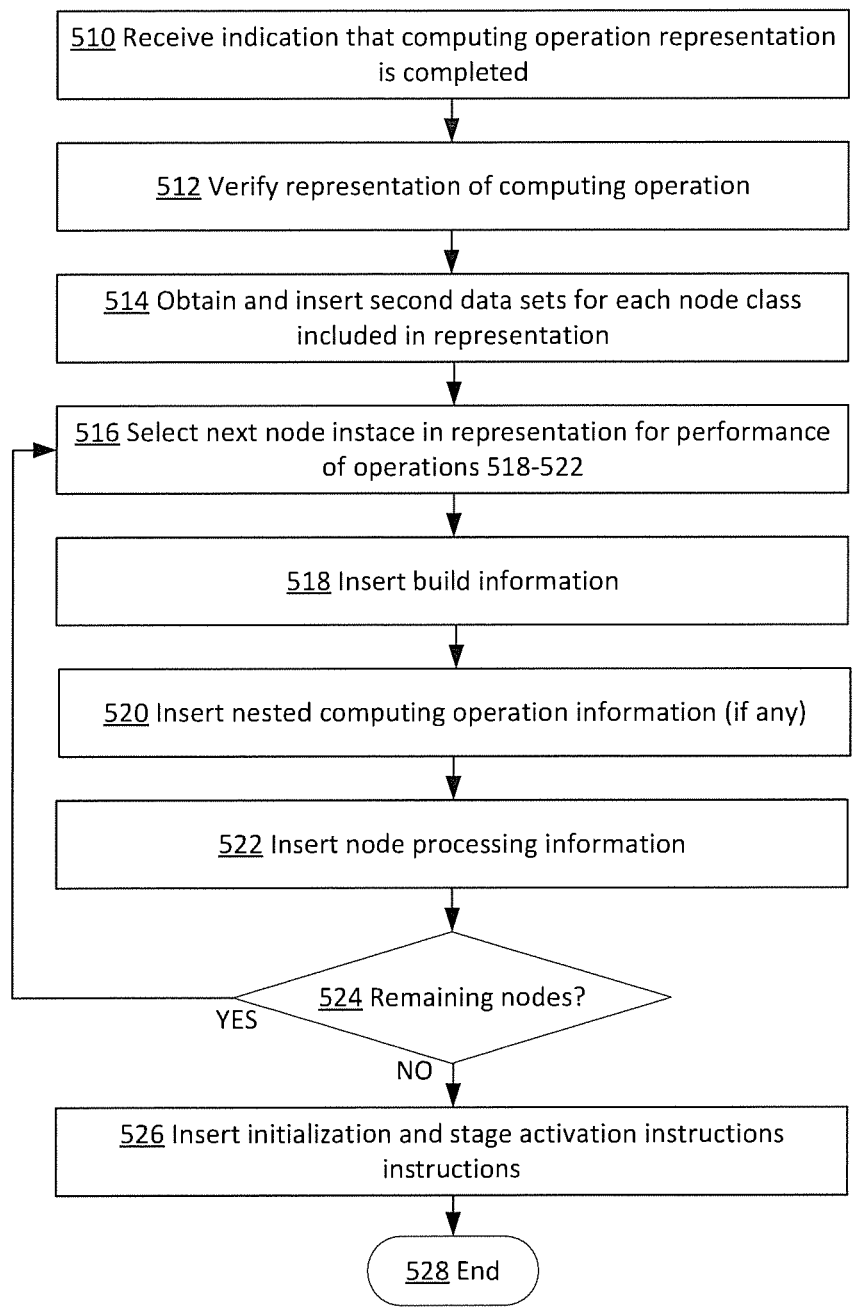
FIG. 5 is a flowchart illustrating an example process for generation of computing operation execution instructions that may be used in accordance with the present disclosure.

FIG. 5 is a flowchart illustrating an example process for generation of computing operation execution instructions that may be used in accordance with the present disclosure. In some examples, the process of FIG. 5 may be performed by visual development interface 111 of FIGS. 1-4. As shown, the process beings at operation 510, at which an indication is received that a computing operation representation, such as visual representation 300 of FIGS. 3-4, is completed. For example, in some cases, a developer may select a menu option or other interface control provided by visual development interface 111 that indicates that the representation is completed and may be used to generate computing operation execution instructions. As set forth above, in some examples, a computing operation representation may include one or more nodes having associated functionality and may indicate input, outputs, and connections between nodes.

At operation 512, the representation of the computing operation may be verified, for example to ensure that it meets a set of requirements, such as requirements for confirming that the computing operation will execute in a valid manner. These requirements may sometimes vary depending on the type of computing operation for which instructions are being generated. As set forth above, in some cases, an event-triggered processing function may be required to have its own operation-specific start node and end node. Also, for example, it may be required that the end node must be reachable from the start node, and that the graph must also be able to reach the end node from any state in the graph, to avoid dead ends and infinite loops. In some examples, these requirements may be verified by performing a depth first node traversal of the representation, starting at the end node and going backwards, reversing all directions of the edges. If the start node is never visited, then it may be determined that the representation has failed its verification. Additionally, any node that is not visited during the traversal of the representation may be considered either an orphaned node or part of a trap/infinite loop. If the representation fails the verification process, then a warning may be generated indicating why the representation has failed verification (e.g., non-terminal paths included in the representation, orphaned nodes, infinite loops, etc.). Thus, if the representation is not verified, then the developer may attempt to fix errors and restart the process.

When the representation is verified, then the process proceeds to operation 514, at which second data sets for each of the node classes included in the representation are obtained and inserted into the computing operation execution instructions. For example, as shown in FIG. 4 and described above, each node class 400 included in the representation has an associated first data set 401 (e.g., C++, other general-purpose language data, etc.) well suited for the visual development interface and an associated second data set 402 (e.g., Node.js, JavaScript, Java, Python, etc.) well suited for the underlying systems of the computing services provider 120. In some examples, the visual development interface may be capable of translating, converting, or otherwise associating each first data set 401 to a respective second set 402. Furthermore, as set forth above, in some cases, the first data set 401 may be executed directly by the computing service provider 120. In these cases, operation 514 may include inserting the first data sets 401 for each node class into the computing operation execution instructions.

At operation 516, a next node instance in the representation is selected for performance of operations 518-522. At operation 518, build information for the currently selected node instance is inserted into the computing operation execution instructions. As set forth above, build information for a node instance may include, for example, an indication of its associated node class, and an identifier that uniquely identifies the node instance within its node class. The build information may also include indications of the node's inputs and outputs, such as indications of output port(s) on the node instance, the node(s) to which they provide output and the input port(s) to which they provide output.

At operation 520, nested computing operation information (if any) is inserted into the computing operation execution instructions. For example, for cases in which the current selected node instance represents or is otherwise associated with a nested computing operation, information for the nested computing operation (e.g., data/information 411-415 of FIG. 4) may be inserted at operation 518. As set forth above, various nested computing operations may sometimes be defined, for example using their own visual representations, and then inserted into and reused in other computing operations. This may save the developer from having to re-create a representation for the nested computing operation each time that the nested computing operation is reused.

At operation 522, node processing information for the current selected node instance is inserted into the computing operation execution instructions. As set forth above, the node processing information may include instructions to activate each input port on each other node that receives output from the selected node, and to send the output to each input port on each other node. Additionally, the node processing information may include instructions to add each other node that receives the output to a list of one or more nodes for activation in a subsequent execution stage (unless the node has already been added to that list).

At operation 524, it is determined whether there are any remaining node instances included in the computing operation representation for which operations 518-522 have not yet been performed. If so, then the process returns to operation 518, at which a next remaining node instance is selected and operations 518-522 are repeated for the next node instance. Upon completion of operations 518-522 for each node instance included in the representation, the process proceeds to operation 526, at which initialization and stage activation instructions are inserted into the computing operation execution instructions. As set forth above, these may include, for example, instructions for initializing node values at the start of execution, instructions for initiating computing operation execution at a first stage at which the start node is activated, instructions for advancing from a current stage to a subsequent stage upon processing of all active nodes for the current stage, and instructions for activating nodes for a subsequent stage upon advancement to the subsequent stage. At operation 528, the process is ended. It is also noted that, although not specifically shown in FIG. 5, the visual development interface and/or other interfaces or services may be employed to generate client side code, or any other code, that initiates or is otherwise associated with event-triggered computing functions and/or other computing operations. Thus, operations for generating client side code corresponding to the computing operation execution instructions may also be employed in addition to, or in combination with, any or all of the operations shown in FIG. 5.

Figure 6:
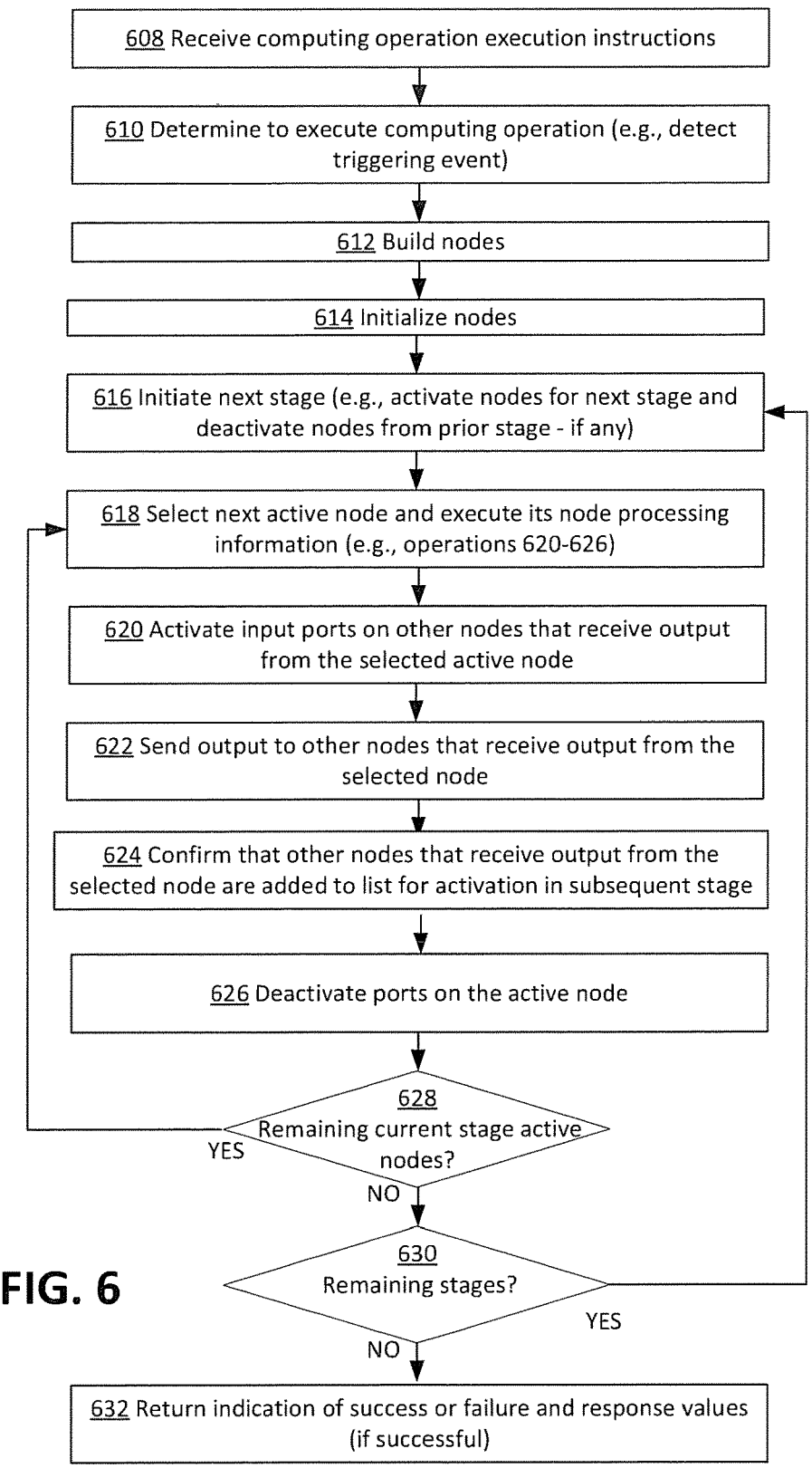
FIG. 6 is a flowchart illustrating an example process for deterministic computing operation execution that may be used in accordance with the present disclosure.

Thus, FIG. 5 depicts an example process for generation of computing operation execution instructions. Upon generation of the completed computing operation execution instructions (e.g., upon proceeding to end operation 528), the computing operation execution instructions may be submitted, for example by visual development interface 111 to computing services provider 120. The computing operation may then be executed by deterministic execution engine 121, for example upon detection of an associated trigger event or other condition. FIG. 6 is a flowchart illustrating an example process for deterministic computing operation execution that may be used in accordance with the present disclosure. Generally, the deterministic execution of the computing operation may include a stage-by-stage node activation process, in which one or more associated nodes are activated in each respective stage. Within at least one (e.g., each) stage, at least one (e.g., each) active node that provides output to one or more other nodes may activate one or input ports on the one or more other nodes, and send one or more outputs to the one or more other nodes based, at least in part, on functionality associated with the active node. The active node may also confirm that the one or more other nodes are added to a list of one or more nodes for activation in a subsequent execution stage.

As shown, the process of FIG. 6 is initiated at operation 608, at which computing operation execution instructions are received, for example by computing services provider 120 from visual development interface 111. As set forth above, the computing operation may be defined at least in part by one or more nodes, and the computing operation execution instructions may be generated based, at least in part, on a representation of the computing operation displayed in a graphical user interface. The representation may include graphical indications of the one or more nodes and inputs and outputs of the one or more of nodes. For example, visual representation 300 of FIG. 3 is a visual representation of a computing operation defined by a plurality of nodes 310-350. At operation 610, a determination is made to execute a computing operation, for example based on detecting of an associated trigger event or other condition that triggers execution of the computing operation.

At operation 612, the nodes within the computing operation are built for execution. In some examples, the nodes within the computing operation may be built based, at least in part, on node build information that may be included within the computing operation execution instructions submitted to the computing services provider 120, such as node build information 412 of FIG. 4. In some examples, the building of nodes at operation 612 may include, for each node, building of the node's inputs and outputs to and from other nodes. It is noted that operation 612 refers to logical building of nodes and does not necessarily require building of any physical structures. Thus, building of a node and its inputs and outputs may be accomplished, for example, by generating data or other logical information that represents the node and/or its functionality. In some examples, building of nodes at operation 612 may include building (or otherwise generating or identifying data) of nested computing operation nodes, for example as may be indicated based on nested computing operation information 413 of FIG. 4.

At operation 614, the nodes are initialized. For example, nodes may be initialized by setting the node values to their initial state as indicated by the computing operation execution instructions. As a specific example, referring back to FIG. 3, node 320 may be set to an initial value of the string "today" as indicated by the "In=today" input port on node 320.

At operation 616, a next execution stage is initiated. Initiation of a next execution stage may include, for example, activation of nodes associated with the next execution stage and deactivation of nodes associated with the prior execution stage (if any). As set forth above, in some examples, only the start node of a computing operation may be activated for the first execution stage. Thus, referring again to FIG. 3, only the start node 310 of FIG. 3 will be activated for the first iteration of operation 616. Additionally, no nodes will be deactivated for the first iteration of operation 616 because there is no stage prior to execution of the first stage.

At operation 618, a next active node is selected for execution of operations 620-626. For example, start node 310 may be selected for the first iteration of operation 618 since it is the only active node in the first execution stage. Operations 620-626 may, in some examples, be executed based on node processing information for the selected active node that may be included in the submitted computing operation execution instructions, such as node processing information 414 of FIG. 4. It is noted that, in some examples, a selected active node may not provide any output to any other node in the representation. For example, end node 350 of FIG. 3 does not provide output to any other nodes. In these cases, operations 620-624 may be skipped for such nodes.

At operation 620, input ports on other nodes that receive input from the selected active node are activated. For example, for the first iteration of operation 620, the "Set" input port on node 320 may be active because it receives output from the node 310. At operation 622, output is sent to other nodes that receive output from the selected active node. For example, for the first iteration of operation 620, output may be sent from "Start" output port on node 310 to the "Set" input port on node 320. In some examples, output for a selected active node may be generated in association with a second data set (e.g., Node.js, JavaScript, Java, Python, etc.) for the node's class that may be included in the submitted computing operation execution instructions, such as in second data sets 411 of FIG. 4.

At operation 624, the selected active node may confirm that each other node that receives output from the selected active node is added to a list of nodes for activation in a subsequent execution stage. For example, for the first iteration of operation 624, node 310 may confirm that node 320 is added to a list of nodes for activation in the subsequent execution stage. In some examples, a node that receives output from a selected active node may already be added to the list by another previously selected active node that also provided output to that particular node. Thus, confirming that a node is added to the list at operation 624 may include, for example, determining whether the node is already included in the list (e.g., added by a prior selected active node) and then adding the node to the list if it is not already included.

At operation 626, ports on the selected active node may be deactivated. For example, for the first iteration of operation 626, the "Start" and "RequestBody" output nodes on start node 310 may be deactivated.

At operation 628, it is determined whether there are any active nodes in the current execution stage that have not yet been selected for performance of operations 620-626. If so, then the process returns to operation 618, at which a next active node is selected and operations 620-626 are repeated for the next active node. If there are no remaining active nodes in the current execution stage, then the process proceeds to operation 630. In the example of FIG. 3, start node 310 is the only active node in the first execution stage, and, therefore, the process will proceed directly to operation 630 after processing of operations 620-626 for start node 310 without first repeating operations 620-626 for another node.

At operation 630, it is determined whether there are remaining execution stages of the computing operation that have not yet been executed. If so, then the process returns to operation 616, at which a next execution stage is initiated. If there are no remaining execution stages, then the process proceeds to operation 632. For the first iteration of operation 630, since only the first execution stage has been executed, it will be determined that are remaining execution stages and the process will return to operation 616 for execution of the second execution stage. In particular, upon returning to operation 616, the nodes associated with the first execution stage will be deactivated. In the example of FIG. 3, this will include deactivating start node 310. Additionally, the nodes associated with the second execution stage will be activated. In the example of FIG. 3, this will include activating node 320. As should be appreciated, in some examples, the nodes that are activated for the second (and subsequent) execution stages may be determined based on the nodes that are added to the list of nodes for activation in the subsequent execution stage at operation 624.

Upon activation of node 320 of FIG. 3, operations 620-626 will be repeated for node 320. In particular, at operation 620, the "Set" and "String2" input ports of node 330 will be activated because they receive output from node 320. At operation 622, node 320 will send the output string "today" to the Set" and "String2" input ports of node 330. At operation 624, node 320 will add node 330 to a list of nodes for activation in the subsequent (i.e., third) execution stage. At operation 626, the ports on node 320 will be deactivated. After performance of these operations, the process will again loop back to operation 616, at which node 320 will be deactivated and node 330 will be activated for the third execution stage. During the third execution stage, node 330 will send output to node 340 and add node 340 to the list of nodes for activation in the subsequent (i.e., fourth) execution stage. During the fourth execution stage, node 340 will send output to end node 350 and add end node 350 to the list of nodes for activation in the subsequent (i.e., fifth) execution stage.

As shown in FIG. 3, end node 350 does not send output to any other nodes, and, therefore, there will be no remaining execution stages after execution of the fifth execution stage. Accordingly, after activation and processing of end node 350, the process will proceed to operation 632, at which the computing operation may return an indication of either a success or a failure of the computing operation execution. If the computing operation is executed successfully, one or more response values may also be returned. For example, in the case of FIG. 3, if the computing operation is executed successfully, the retrieved message of the day value may be returned. It is noted that, in some examples, execution of a computing operation, such as shown in the example of FIG. 6, may abort or terminate early, such as may occur when execution is routed from a prior node to the end node without activating one or more intermediate nodes. Thus, there is no requirement that all nodes within a computing operation must be activated every time that the computing operation is executed.

It is noted that, in some examples, the deterministic execution process of FIG. 6 may be employed for computing operations that include branching and looping operations, such as defined by a representation that includes a node branch (e.g., two or more nodes that branch from another node based on one or more conditions) and/or a node loop (e.g., returning to a node from at least one other node). In some examples, support for such branching and looping operations may be enabled, at least in part, by the representation verification process, such as the example described above with respect to operation 512 of FIG. 5. As described above, the representation verification process may verify that the representation includes no non-terminal paths, no infinite loops, and no orphaned nodes. This may help to ensure that the stage-by-stage activation process may be employed in a reliable manner to execute the computing operation.

Figure 7:
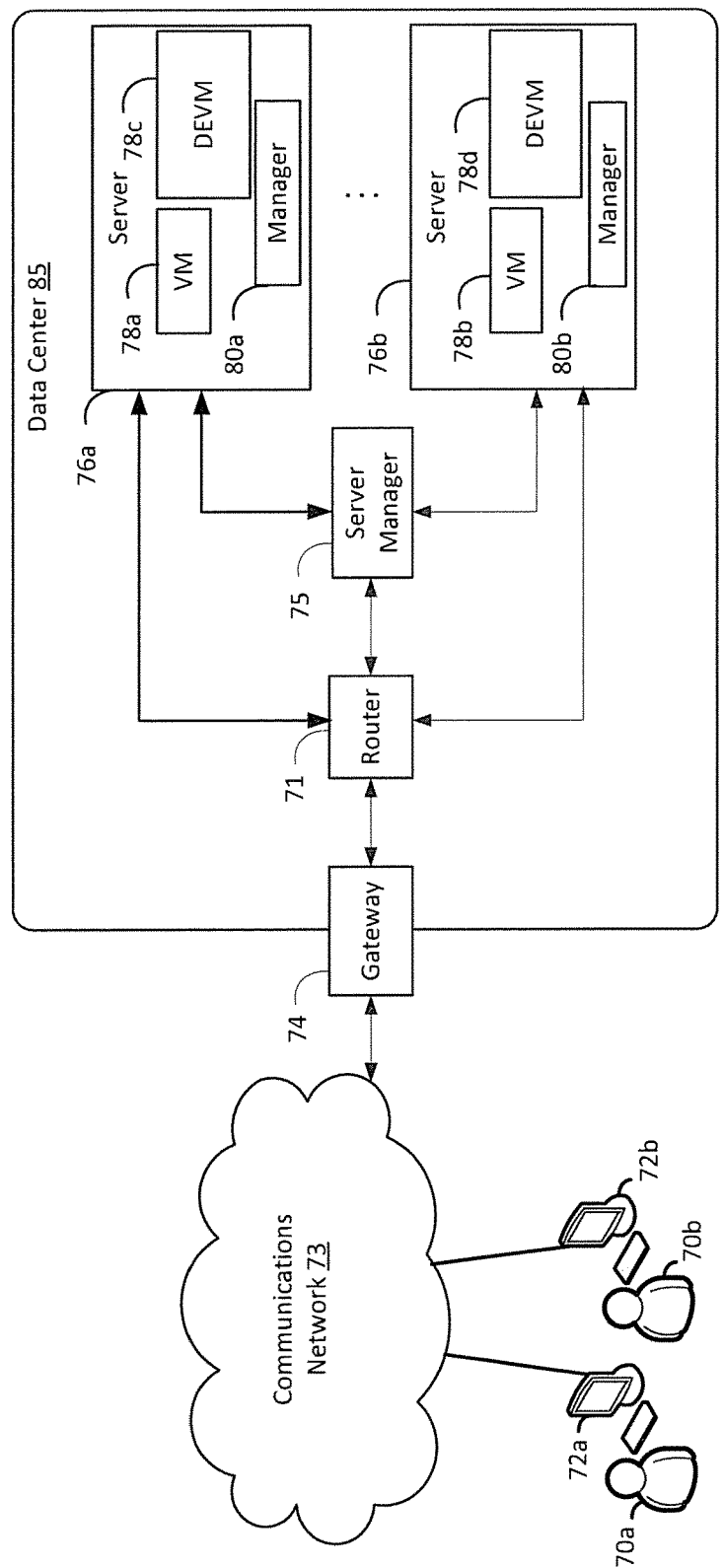
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension.

These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are deterministic execution ("DEVM") instances. The DEVM virtual machine instances 78c and 78d may be configured to perform all, or any portion, of the techniques for deterministic execution for visually developed computing operations and/or any other of the disclosed techniques in accordance with the present disclosure and described in detail above. As should be appreciated, while the particular example illustrated in FIG. 7 includes one DEVM virtual machine in each server, this is merely an example. A server may include more than one DEVM virtual machine or may not include any DEVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76*a* and 76*b*. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
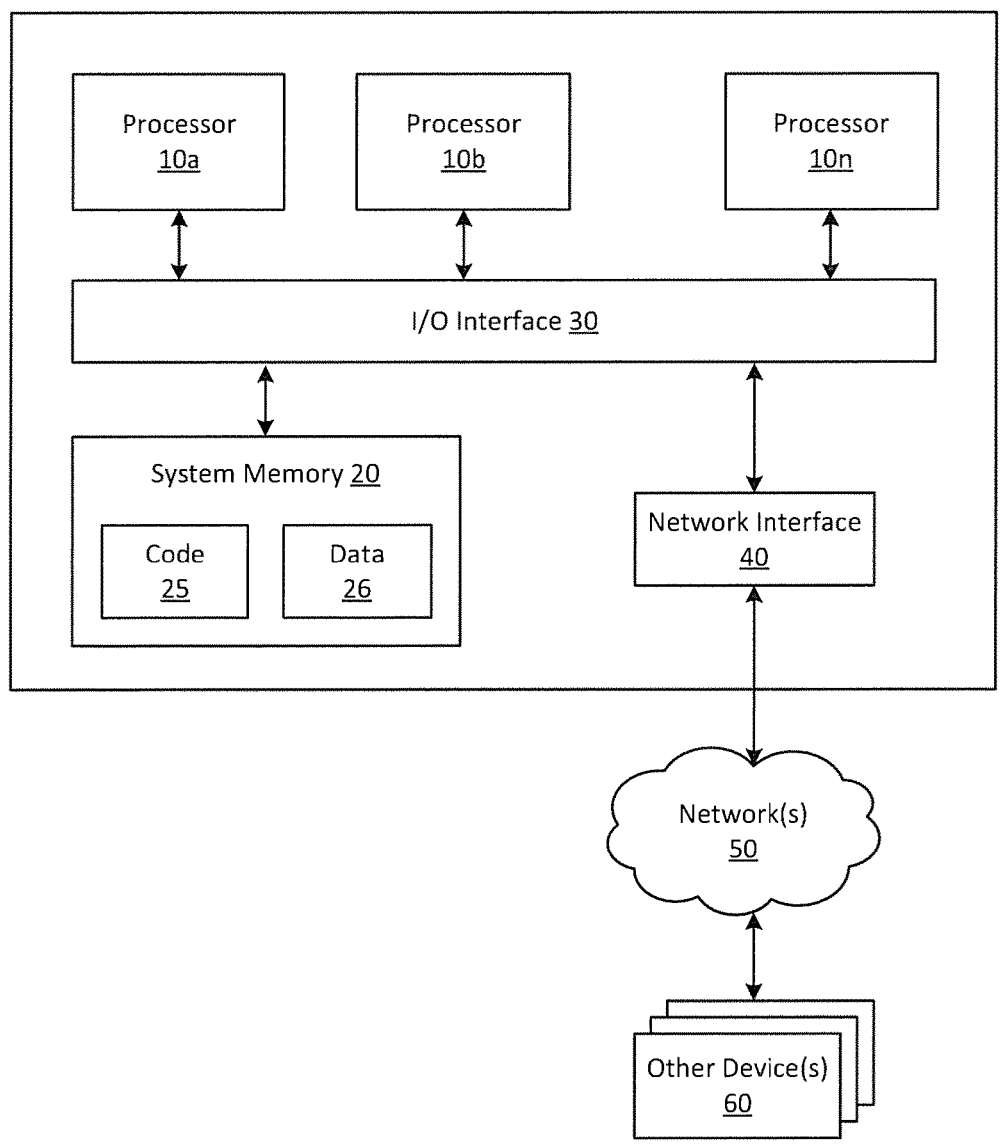
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors
   one or more memories storing a set of first instructions, which upon execution by the one or more processors, causes the one or more processors to at least:
   receive second instructions to perform a computing operation indicated at least in part by a plurality of nodes; and
   execute the second instructions using a plurality of execution stages,
   wherein a first execution stage of the plurality of execution stages comprises activating a first node of the plurality of nodes and sending one or more outputs to one or more other nodes of the plurality of nodes,
   wherein the one or more other nodes are activated in a second execution stage of the plurality of execution stages, and
   wherein the computing operation is performed via execution of the second instructions.

2. The system of claim 1, wherein the first execution stage further comprises confirming that the one or more other nodes are added to a list of one or more nodes for activation in the second execution stage.

3. The system of claim 1, wherein the first execution stage further comprises activating one or input ports on the one or more other nodes.

4. The system of claim 1, wherein the computing operation comprises an event-triggered computing function.

5. The system of claim 1, wherein the plurality of nodes comprise one or more nodes that are instances of a respective node class that has an associated first data set formatted in a first computing language and a respective second data set formatted in a second computing language.

6. The system of claim 5, wherein the first computing language comprises C++, and wherein the second computing language comprises at least one of NODE.JS, JAVASCRIPT, JAVA, or PYTHON.

7. The system of claim 1, wherein the second instructions are generated based, at least in part, on verification that a representation of the computing operation does not include any of a non-terminating path, an infinite loop, or an orphaned node.

8. The system of claim 7, wherein the representation comprises at least one of a node branch or a node loop.

9. The system of claim 1, wherein the computing operation is an asynchronous operation.

10. A method comprising:
    receiving instructions to perform a computing operation indicated at least in part by a plurality of nodes; and
    executing the instructions using a plurality of execution stages,
    wherein a first execution stage of the plurality of execution stages comprises activating a first node of the plurality of nodes and sending one or more outputs to one or more other nodes of the plurality of nodes, and wherein the one or more other nodes are activated in a second execution stage of the plurality of execution stages, and wherein the computing operation is performed via the executing of the instructions.

11. The method of claim 10, wherein the first execution stage further comprises confirming that the one or more other nodes are added to a list of one or more nodes for activation in the second execution stage.

12. The method of claim 10, wherein the first execution stage further comprises activating one or input ports on the one or more other nodes.

13. The method of claim 10, wherein the computing operation comprises an event-triggered computing function.

14. The method of claim 13, further comprising detecting a triggering event that triggers execution of the event-triggered computing function.

15. The method of claim 10, wherein the plurality of nodes comprise one or more nodes that are instances of a respective node class that has an associated first data set formatted in a first computing language and a respective second data set formatted in a second computing language.

16. The method of claim 15, wherein the first computing language comprises C++, and wherein the second computing language comprises at least one of NODE.JS, JAVASCRIPT, JAVA, or PYTHON.

17. The method of claim 10, wherein the instructions are generated based, at least in part, on verification that a representation of the computing operation does not include any of a non-terminating path, an infinite loop, or an orphaned node.

18. The method of claim 17, wherein the representation comprises at least one of a node branch or a node loop.

19. The method of claim 10, wherein the computing operation is an asynchronous operation.

20. One or more non-transitory computer-readable storage media having stored thereon first instructions that, upon execution by one or more computing devices, cause the one or more computing devices to at least:

receive second instructions to perform a computing operation indicated at least in part by a plurality of nodes; and execute the second instructions using a plurality of execution stages, wherein a first execution stage of the plurality of execution stages comprises activating a first node of the plurality of nodes and sending one or more outputs to one or more other nodes of the plurality of nodes, wherein the one or more other nodes are activated in a second execution stage of the plurality of execution stages, and wherein the computing operation is performed via execution of the second instructions.

* * * * *